(12) United States Patent
Dubrovina et al.

(10) Patent No.: US 9,471,991 B2
(45) Date of Patent: Oct. 18, 2016

(54) IMAGE EDITING USING LEVEL SET TREES (71) Applicant: Technion Research & Development Foundation Limited, Haifa (IL)

(72) Inventors: Anastasia Dubrovina, Haifa (IL); Rom Hershkovitz, Kochav Yair (IL); Ron Kimmel, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 14/918,891

(22) Filed: Oct. 21, 2015

(65) Prior Publication Data

US 2016/0117836 A1   Apr. 28, 2016

Related U.S. Application Data (60) Provisional application No. 62/067,692, filed on Oct. 23, 2014.

(51) Int. Cl.
| | |
|---|---|
| G06K 9/00 | (2006.01) |
| G06T 7/00 | (2006.01) |
| G06K 9/52 | (2006.01) |
| G06T 7/60 | (2006.01) |

(52) U.S. Cl.
CPC .............. *G06T 7/0093* (2013.01); *G06K 9/52* (2013.01); *G06T 7/60* (2013.01); *G06T 2207/20112* (2013.01)

(58) Field of Classification Search
None
See application file for complete search history.

(56) References Cited

U.S. PATENT DOCUMENTS

| | | | |
|---|---|---|---|
| 2009/0148024 A1* | 6/2009 | Park | G06T 7/0081 382/134 |
| 2012/0128219 A1* | 5/2012 | Pascal | G06T 7/0081 382/128 |
| 2015/0110392 A1* | 4/2015 | Wang | G06T 7/0087 382/164 |

OTHER PUBLICATIONS

Xu, Yongchao, Thierry Géraud, and Laurent Najman. "Context-based energy estimator: Application to object segmentation on the tree of shapes." 2012 19th IEEE International Conference on Image Processing. IEEE, 2012.*

Xu, Yongchao, Thierry Géraud, and Laurent Najman. "Morphological filtering in shape spaces: Applications using tree-based image representations." Pattern Recognition (ICPR), 2012 21st International Conference on. IEEE, 2012.*

(Continued)

*Primary Examiner* — Li Liu
(74) *Attorney, Agent, or Firm* — Roach Brown McCarthy & Gruber, P.C.; Kevin D. McCarthy (57) ABSTRACT

A method comprising: mapping an image onto multiple level sets connected by multiple branches, wherein each of said level sets corresponds to a predefined range of values for an attribute of said image; associating multiple pixels of said image to said multiple level sets in accordance with the value of each pixel; identifying a source level set associated with a source pixel of said multiple pixels; for each of said multiple pixels, determining that a distance between said source pixel and one of said multiple pixels is within a predefined threshold, wherein said distance is calculated as a function of a first distance between said source level set and said level set associated with said one of said multiple pixels; in one embodiment, the determined distance is applied to an image processing application to produce a processed image, and the processed image is rendered on a rendering medium.

20 Claims, 5 Drawing Sheets

(56) References Cited

OTHER PUBLICATIONS

Géraud, Thierry, et al. "A quasi-linear algorithm to compute the tree of shapes of nD images." International Symposium on Mathematical Morphology and Its Applications to Signal and Image Processing. Springer Berlin Heidelberg, 2013.*

H. Zhao, "A Fast Sweeping Method for Eikonal 15 Equations", Mathematics of computation, vol. 74, No. 250, pp. 603-627, 2005 (25 pages).

E. W. Dijkstra, 5 "A Note on Two Problems in Connexion with Graphs", Numerische Mathematik, vol. 1, No. 1, pp. 269-271 1959. (3 pages).

X. Bai and G. Sapiro, "Geodesic matting: A framework for fast interactive image and video segmentation and matting", International Journal of Computer Vision, vol. 82, No. 2, pp. 113-132, 2009. (20 pages).

P. Monasse and F. Guichard's, "Fast Computation of a Contrast-Invariant Image Representation", Image Processing, IEEE Transacations on, vol. 9, No. 5, pp. 860-872, 2000 (13 pages).

S. Crozet and T. Geraud, "A first parallel algorithm to compute the morphological tree of shapes of nd images", Proceedings of the 21st IEEE International Conference on Image Processing (ICIP), 2014 (5 pages).

* cited by examiner

IMAGE EDITING USING LEVEL SET TREES

FIELD OF THE INVENTION

The invention relates to the field of image processing.

BACKGROUND

Level set methods are commonly used in image processing, computer graphics and computational geometry. Various image editing algorithms for image segmentation, matting, denoising, colorization, etc. are based on computing image-aware geodesic distances. These distances may be computed in the image domain and approximated using known methods, such as Dijkstra's algorithm described in Numerisch Mathematik 1959, vol. 1 no 1 pp. 269-271, or a fast marching algorithm such as described in J. A. Sethian "Level Set Methods and Fast Marching Methods", Dept. of Mathematics, Univ. of California, Berkeley, Calif. 94720, or fast sweeping method, such as described in H. Zhao, "A Fast Sweeping Method for Eikonal Equations", Mathematics of computation, vol. 74, no. 250, pp 603-627, 2005.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for segmenting an image, the method comprising using at least one hardware processor for: mapping an image onto a level set tree, wherein said level set tree comprises multiple level sets connected by multiple branches, and wherein each of said multiple level sets corresponds to a predefined range of values for an attribute of said image; associating multiple pixels of said image to said multiple level sets of said level set tree, in accordance with a value for each of said pixels for said attribute; identifying a first source level set of said multiple level sets associated with a first source pixel of said multiple pixels; determining that an image-domain distance between said first source pixel and one of said multiple pixels is within a predefined threshold, wherein said image-domain distance is calculated as a function of a first level-set tree distance between said first source level set and said level set associated with said one of said multiple pixels; associating said one of said multiple pixels with a first pixel set corresponding to said first source pixel; and rendering said first pixel set on a rendering medium.

There is provided, in accordance with an embodiment, a computer program product for segmenting an image, the computer program product comprising a non-transitory computer-readable storage medium having program code embodied therewith, the program code executable by at least one hardware processor to: map an image onto a level set tree, wherein said level set tree comprises multiple level sets connected by multiple branches, and wherein each of said multiple level sets corresponds to a predefined range of values for an attribute of said image; associate multiple pixels of said image to said multiple level sets of said level set tree, in accordance with a value for each of said pixels for said attribute; identify a first source level set of said multiple level sets associated with a first source pixel of said multiple pixels; determine that an image-domain distance between said first source pixel and one of said multiple pixels is within a predefined threshold, wherein said image-domain distance is calculated as a function of a first level-set tree domain distance between said first source level set and said level set associated with said one of said multiple pixels; associate said one of said multiple pixels with a first pixel set corresponding to said first source pixel; and render said first pixel set on a rendering medium.

There is provided, in accordance with an embodiment, a method for processing an image, the method comprising using at least one hardware processor for: mapping a candidate image onto a level set tree, wherein said level set tree comprises multiple level sets connected by multiple branches, and wherein each of said multiple level sets corresponds to a predefined range of values for an attribute of said candidate image; associating multiple pixels of said candidate image to said multiple level sets of said level set tree, in accordance with a value for each of said pixels for said attribute; identifying a first source level set of said multiple level sets associated with a first source pixel of said multiple pixels; determining that an image-domain distance between said first source pixel and one of said multiple pixels is within a predefined threshold, wherein said image-domain distance is calculated as a function of a first level-set tree distance between said first source level set and said level set associated with said one of said multiple pixels; applying said determined image-domain distance to an image processing application, thereby producing a processed image from said candidate image; and rendering said processed image on a rendering medium.

There is provided, in accordance with an embodiment, a computer program product for image processing, comprising a non-transient computer readable medium having stored thereon instructions which, when executed on at least one hardware processor, cause the at least hardware processor to: map a candidate image onto a level set tree, wherein said level set tree comprises multiple level sets connected by multiple branches, and wherein each of said multiple level sets corresponds to a predefined range of values for an attribute of said candidate image; associate multiple pixels of said candidate image to said multiple level sets of said level set tree, in accordance with a value for each of said pixels for said attribute; identify a first source level set of said multiple level sets associated with a first source pixel of said multiple pixels; determine that an image-domain distance between said first source pixel and one of said multiple pixels is within a predefined threshold, wherein said image-domain distance is calculated as a function of a first level-set tree distance between said first source level set and said level set associated with said one of said multiple pixels; apply said determined image-domain distance to an image processing application, thereby producing a processed image from said candidate image; and render said processed image on a rendering medium.

In some embodiment, the method further comprises identifying a second source level set of said multiple level sets associated with a second source pixel of said multiple pixels; determining that an image-domain distance between said second source pixel and a second one of said multiple pixels is within said predefined threshold, wherein said image-domain distance is calculated as a function of a second level-set tree distance between said second source level set and said level set associated with said second one of said multiple pixels; associating said second one of said multiple pixels with a second pixel set corresponding to said second source pixel; and rendering said second pixel set on said rendering medium.

In some embodiments, the program code is further executable to: identify a second source level set of said multiple level sets associated with a second source pixel of said multiple pixels; determine that an image-domain distance between said second source pixel and a second one of said multiple pixels is within said predefined threshold, wherein said image-domain distance is calculated as a function of a second level-set tree distance between said second source level set and said level set associated with said second one of said multiple pixels; associate said second one of said multiple pixels with a second pixel set corresponding to said second source pixel; and render said second pixel set on said rendering medium.

In some embodiments, said first level-set tree distance and said second level set tree distance are calculated by applying Dijkstra's algorithm to said level set tree.

In some embodiments, identifying said first source level set comprises identifying a first mark applied by a user to said first source pixel and associating said first marked source pixel with said first source level set, and wherein identifying said second source level set comprises identifying a second mark applied by said user to said second source pixel and associating said second marked source pixel with said second source level set.

In some embodiments, said level said tree is constructed from a related tree of shapes corresponding to said image.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A method is disclosed for computing image-aware geodesic distances, such as for image editing algorithms. A candidate image comprising multiple pixels that are arranged over a Cartesian grid may be mapped onto a level set tree. The candidate image may be represented as a topographic map comprising multiple level lines, where each level line may correspond to a value, or range of values for an attribute of the image, such as intensity or hue, to name a few. The level lines may define the borders of multiple level sets, and the pixels of the image may be associated with the level sets according to their corresponding values for the attribute.

The level sets may be represented as multiple nodes on a hierarchical level set tree. Thus, the nodes of the level set tree may each correspond to a predefined value or range of values for the attribute of the image. The pixels of the image may be associated with the nodes, or level sets of the level set tree according to the value for the attribute for each pixel.

The nodes of the level set tree may be connected by one or more branches, where a branch connecting any two nodes of the level set tree may represent the adjacency of the associated pixels in the image domain. In this manner, an image domain distance between one or more pixels of the image may be represented as a level-set tree domain distance between the nodes associated with the pixels, and a distance between any two pixels may be evaluated as a function of a corresponding distance between their associated level sets on the level set tree.

Thus, an image-domain distance, such as a difference computed using any suitable attribute values, such as using values for hue, shade, color or intensity, to name a few, on the candidate image may thus be reformulated and computed in the domain of the level set tree, thereby avoiding approximation errors that may be typical to conventional methods. The corresponding distance on the level tree set may be computed using any suitable method, such as the method described in E. W. Dijkstra, "A Note on Two Problems in Connexion with Graphs", Numerische Mathematik, vol. 1, no. 1, pp. 269-271 1959.

In one embodiment, the computer distances may be applied to an image processing application. The image domain distance determined as described herein, may be applied to an image processing application to produce a processed image from the candidate image. The processed image may be rendered on a rendering medium.

In one embodiment, the computed distances may be applied to segmenting the candidate image. One or more source pixels may be identified on the candidate image, such as by identifying a mark applied to the pixel by a user, and a level set associated with the selected source pixels may be identified on the level set tree as a source level set. An image-domain distance between the source pixels and the remaining pixels of the candidate image may be calculated in the level-set tree domain, as a function of the distances between the source level set and the level sets associated with the remaining pixels, such as may be calculated using Dijkstra's method disclosed above.

In this manner, it may be determined that an image-domain distance between a pixel and the selected source pixels falls within a predefined threshold, and the pixel may be associated with a first pixel set corresponding to the selected source level pixels. The first pixel set may be rendered on a rendering medium, thereby segmenting the candidate image.

The above steps may be repeated with additionally selected source pixels, resulting in multiple pixel sets corresponding to multiple selected source pixels. In this manner, the candidate image may be divided into multiple pixel sets, each corresponding to one or more separately selected source pixels. The pixel sets may be separately rendered on the rendering medium, thereby segmenting the candidate image.

In another embodiment, a user may select the multiple source pixels by applying one or more marks, or 'scribbles', to the candidate image, such as described in X. Bai and G. Sapiro, "Geodesic matting: A framework for fast interactive image and video segmentation and matting", International Journal of Computer Vision, vol. 82, no. 2, pp. 113-132, 2009.

In one embodiment, a first pixel set, as determined above, may correspond to a foreground portion of the candidate image, and a second source pixel set, as determined above, may correspond to a background portion of the candidate image. In this manner the candidate image may be segmented into a foreground portion and a background portion, for rendering separately on the rendering medium.

In general, an image-aware distance d between two points p, p' on an image I defined over a domain $\Omega \subset R^2$ may be represented as follows:

$$d(p, p') = \min_{C_{p,p'}} \int_0^1 |\nabla I(C(t)) \cdot \dot{C}(t)| dt, \qquad (1)$$

where $C_{p,p'}(t)$ may be a curve in domain $\Omega$ with end points p, p'$\in \Omega$, and where $\nabla$ represents a gradient, or variation of the image over a variable t. Thus, the distance represented by Eq. (1) may measure the minimal total variation with respect to the predefined attribute along all possible parametric curves $C_{p,p'}(t)$ between the points p, p'$\in \Omega$ of the image.

The distance d(p,p') may be decomposed, such as by recursive decomposition, into segments corresponding to multiple discrete level sets defined for the image. The level sets may include level lines representing the boundary between one level set and another, where segments that follow the level set lines may have a length of zero, since $|\nabla I \cdot C(t)|=0$ along a given level set line, and segments that are perpendicular to the level lines may have a total length of d(p,p').

A k-level set for the image, denoted by $\gamma^k$, may be defined over a domain $\Omega$ to include the multiple points, or pixels p in domain $\Omega$ for which the image at point p has the value k, and may be expressed as:

$$\gamma^k = \{p \in \Omega | I(p)=k\}. \qquad (2)$$

The level set $\gamma^k$ may include any number of subsets of connected, or contiguous points or pixels, where the i$^{th}$ k-level subset of the k-level set may be denoted by $\gamma^k_i$. Multiple k-level subsets of contiguous pixels may thus be denoted by $\Gamma = \{\gamma^k_i\}_{i,k}$. A spatial distance between the pixels within a given level set may be used to determine if the pixels are contiguous, and therefore, belong in the same k-level contiguous subset.

The level sets may be represented by nodes on the level set tree, where a node $\gamma^k$ may represent connected points associated with level set k, and node $\gamma^m$ may represent connected points associated with level set m.

Edges connecting the nodes of the level set tree may represent an adjacency measurement of the level sets corresponding to those nodes, and thus, may represent a corresponding adjacency measurement in the image domain of the points associated with those level sets.

The level set tree may be described as a weighted graph $(\Gamma, E, F)$ as follows:
  $\Gamma$ may denote the nodes of the tree, corresponding to the level sets;
  E and may denote the edges connecting the nodes, and may have the form $E \subseteq \Gamma \times \Gamma$; and
  F may represent weights assigned to graph edges E, and may have the form $F: E \to R^+$.

F may be evaluated as the absolute difference of the level set values of the nodes, corresponding to the image values as follows:

$$F(\gamma^k, \gamma^m) = |k - m|, \qquad (3)$$

Figure 1:
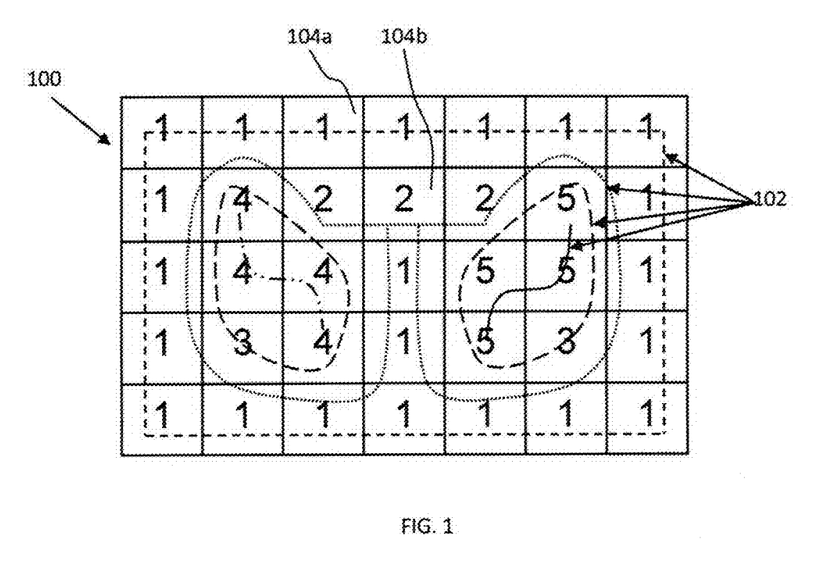
FIG. 1 illustrates a candidate image comprising multiple pixels with assigned values corresponding to a predefined attribute.
Figure 2:
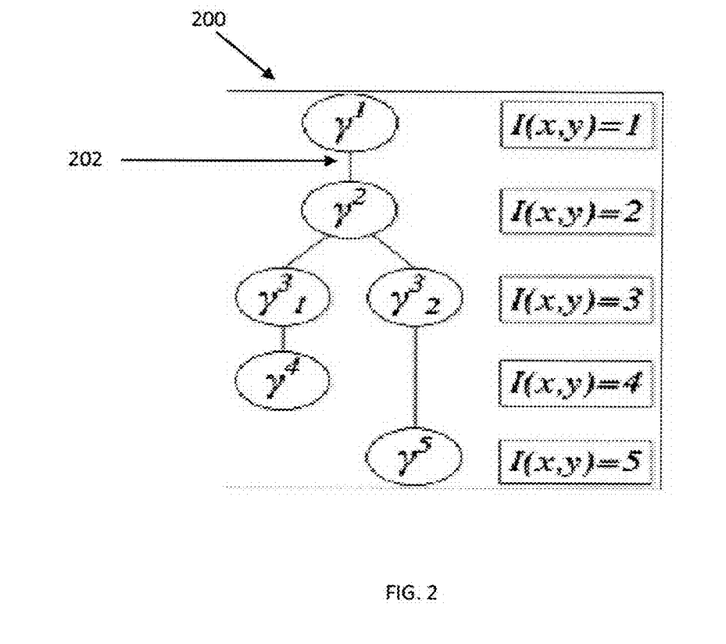
FIG. 2 illustrates an exemplary level set tree representation of the image of FIG. 1, in accordance with an embodiment of the invention.

Reference is now made to FIGS. 1-2, which, taken together, illustrate an exemplary pixelate image 100, shown with pixel attribute values 1-5, mapped onto a corresponding level set tree 200, in accordance with an embodiment of the invention. The attribute values may correspond to color intensity level, hue, gray scale, or any other suitable attribute for segmenting the image. The pixels may be grouped according to their attribute values, demarcated by dashed lines 102 representing multiple level lines that define multiple level sets. The level sets may correspond to the nodes of level set tree 200. For example, pixel $p_1$ 104a, with an attribute value of 1 may be associated with a level set $I(x,y)=1$, or node $\gamma^1$ of level set tree 200, and pixel $p_2$ 104b with an attribute value of 2 may be associated with an adjacent level set $I(x,y)=2$, or node $\gamma^2$ of level set tree 200, and so on. Since image 100 includes two separate sets of contiguous pixels with an attribute level of 3, these may be mapped onto two separate nodes $\gamma^3_1$ and $\gamma^3_2$ on level set tree 200, each connected by a branch to level set $I(x,y)=2$, corresponding to node $\gamma^2$, but not connected to each other. Thus a node on tree 200 represents a set of contiguous pixels with the same attribute value.

The distance between a pixel with attribute value 1 associated with the level set $I(x,y)=1$, labeled $\gamma^1$, and a pixel with attribute value 2 associated with the level set $I(x,y)=2$, labeled $\gamma^2$, may be determined as the absolute difference on the level set tree between the respective associated level sets, $I(x,y)=1$ and $I(x,y)=2$, which equals one. Since level sets $\gamma^1$ and $\gamma^2$ are adjacent in image I, a branch 202 may connect them, and may be assigned a weight value of 1 corresponding to the distance between the two nodes. Similarly, the distance between a pixel with attribute value 2 associated with the level set $I(x,y)=2$, labeled $\gamma^2$, and a pixel with attribute value 3 associated with the level set $I(x,y)=3$ labeled $\gamma^3$, may be determined as the absolute difference on the level set tree between the respective associated level sets, $I(x,y)=2$ and $I(x,y)=3$, which also equals one. Since $\gamma^2$ and $\gamma^3$ are adjacent level sets in image I, a branch 204 connecting nodes $\gamma^2$ and $\gamma^3$ in the level set tree and is assigned a weight value of 1 corresponding to the distance between the nodes.

Similarly, the distance between a pixel with attribute value 1 and a pixel with attribute value 3 may be determined as the distance on the level set tree between associated level sets $I(x,y)=1$, or $\gamma^1$ and $I(x,y)=3$, or $\gamma^3$, which may be $|3-1|=2$.

Thus, the distance between any two pixels of image 100 may be mapped to a corresponding distance between their associated level sets, or nodes, on tree 200 and may be calculated using any known algorithm such as Dijkstra's algorithm referenced above, in accordance with any weights assigned to the branches connecting the nodes.

To show equivalence between the image-aware distance described in Eq. (1) and a distance computed over the level set tree, it is noted that the gradient function may be expanded as follows:

$$|\nabla I(C(t)) \cdot \dot{C}(t)| dt = \qquad (4)$$
$$\left| \frac{dI}{dx}\frac{dx}{dt} + \frac{dI}{dy}\frac{dy}{dt} \right| dt = \left| \frac{dI}{dx}dx + \frac{dI}{dy}dy \right| = |dI(C(t))|.$$

Substituting the above formulation into Eq. (1), the intrinsic distance d(p, p') measuring the minimal total variation of image I(x,y) over all possible paths C connecting points p and p' may be expressed as $$d(p, p') = \min_{C_{p,p'}} \int_0^1 |dI(C(t))|, \qquad (5)$$

Figure 3:
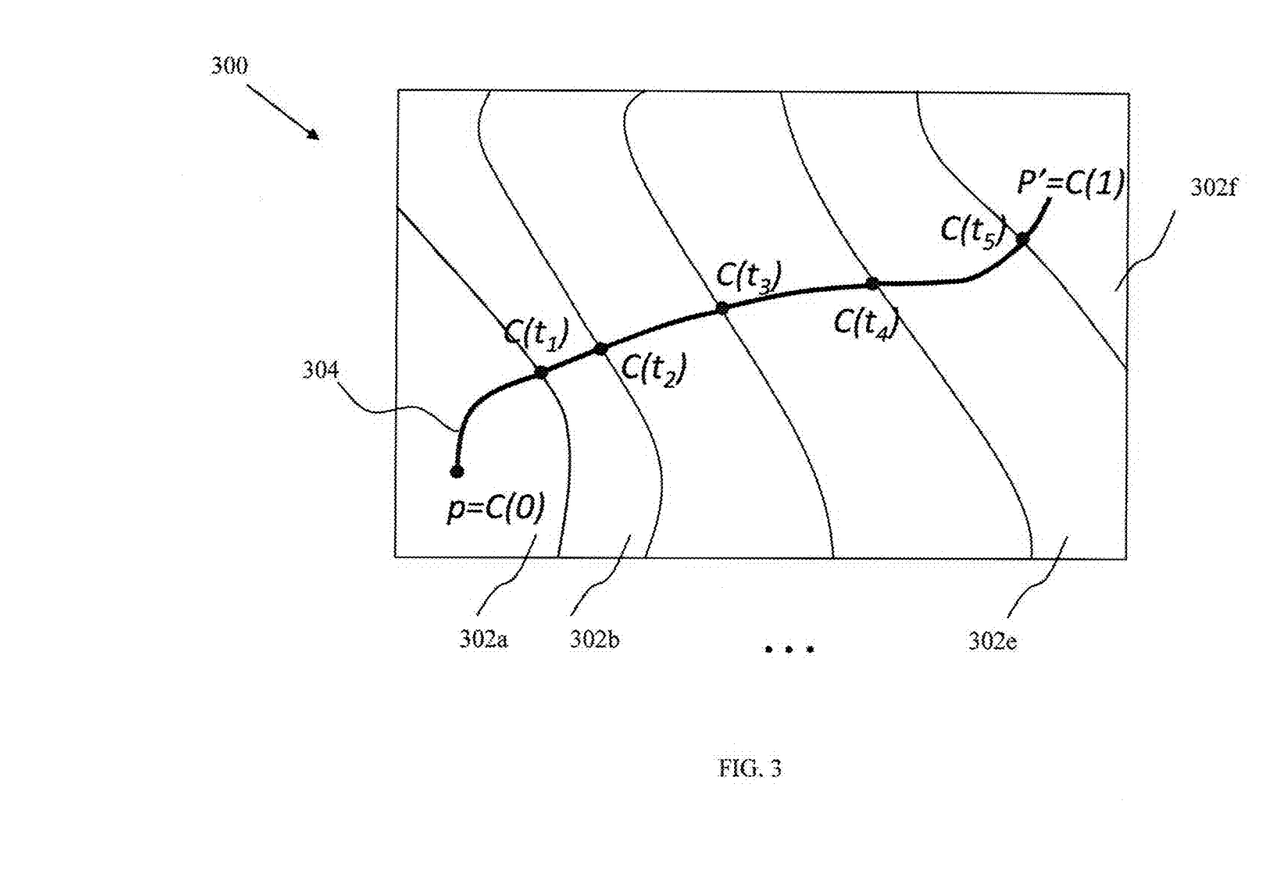
FIG. 3 illustrates a black and white rendition of a greyscale or colored mapping of an exemplary image onto multiple level sets, in accordance with an embodiment of the invention.

Reference is now made to FIG. 3 which illustrates, for reasons of clarity, a black and white rendition of a color or greyscale mapping of image I 300 onto multiple level sets 302*a*-302*f*, in accordance with an embodiment of the invention. Each level set may represent a predefined value, or range of values for a given attribute of image I over domain Ω. A path C(t) 304 is shown traversing image I from point p to p', and crossing the multiple level sets 302*a*-302*f*. Level sets 302*a*-302*f* are shown as uniformly white in FIG. 3 for clarity purposes only, as stated above, and each of level sets 302*a*-302*f* may represent a different value of the given attribute, such as a different intensity, shade, color, and/or hue value, to name a few. Path C(t) may be divided into multiple non-overlapping segments, bounded by points C(0), C(t$_1$), C(t$_2$) . . . C(t$_5$), C(1) shown on curve 304, corresponding to multiple level sets 302*a*-302*f*, such as via recursive decomposition, and may be expressed as:

$$C_i(t) = \{C(t), t \in [t_i, t_{i+1})\}, C(t) = \bigcup_{i \geq 0} C_i(t), \qquad (6)$$

where $$t_{i+1} = \min_{1 \geq t > t_i} t \text{ s.t. } I(C(t)) \neq I(C(t_i)). \qquad (7)$$

Thus, for two consecutive non-overlapping segments C(t$_1$) and C(t$_2$) of path C(t), points of image I that lie on path segment C() may have values k$_1$=I(C(t$_1$)) corresponding to a level set γ$^{k1}$, and points of image I that lie on path segment C(t$_2$) may have values k$_2$=I(C(t$_2$)) corresponding to a level set γ$^{k2}$. In this manner, a path between a pair of points in the image domain may be mapped to corresponding multiple level sets:

$$C(t) = \bigcup_{i \geq 0} C_i(t) \Rightarrow C_\Gamma = \{\gamma^{k_i}\}_{i \geq 0}. \qquad (8)$$

This mapping may be applied to the intrinsic distance expressed in Eq. (5). By decomposing the path C(t) into a series of non-overlapping segments corresponding to multiple level sets, the distance between any two points p, p' of the image I may be calculated in the level set domain as the difference between the values assigned to the corresponding level sets, as follows:

$$d(p, p') = \min_{C_{p,p'}} \sum_{i \geq 0} \int_{t_i}^{t_{i+1}} |dI(C(t))| = \min_{C_{p,p'}} \sum_{i \geq 0} |k_{i+1} - k_i|. \qquad (9)$$

Referring back to Eq. (3), the difference |k$_{i+1}$−k$_i$| may be used to evaluate the weight F(γ$^{k_i}$,γ$^{k_{i+1}}$) of a branch connecting the nodes representing the level sets γ$^{ki}$ and γ$^{ki+1}$ in the level set tree. In this manner, the length of the minimal geodesic between the pair of points p and p' of the image may correspond to the minimal path in the level set tree, and may be evaluated as follows:

$$d(p, p') = \min_{C_\Gamma(p,p')} \sum_{i \geq 0} F(\gamma^{k_i}, \gamma^{k_{i+1}}), \qquad (10)$$

where C$_\Gamma$(p, p') may denote a path in level set tree between verteces γ$^{I(p)}$ and γ$^{I(p')}$.

In one embodiment, the level set tree corresponding to a candidate image may be an undirected acyclic graph, where the minimal length path between two nodes of the tree corresponds to any of multiple minimal length paths in the image domain between the two pixels corresponding to those nodes. Thus, for a given pair of pixels of the candidate image that are mapped onto a pair of nodes on the corresponding level set tree, the minimal path between the nodes may represent all the possible minimal length paths between the corresponding pixels in the image domain.

In one embodiment, the level set tree for a candidate image may be constructed from a related tree of shapes, such as by applying a publicly available implementation of P. Monasse and F. Guichard's, "Fast Computation of a Contrast-Invariant Image Representation", Image Processing, IEEE Transactions on, vol. 9, no. 5, pp. 860-872, 2000, or S. Crozet and T. Geraud, "A first parallel algorithm to compute the morphological tree of shapes of nd images", Proceedings of the 21st IEEE International Conference on Image Processing (ICIP), 2014.

A shape may be defined as all image pixels belonging to a connected level set component and its interior. The outer boundary of a level set of connected components γ$^k$ may be denoted by J(γ$^k$). A shape S$^k$ corresponding to the curve J(γ$^k$) may be defined as the image region enclosed by it $$S^k = \{p \in \Omega | p \in \text{the interior of } J(\gamma^k)\}. \qquad (11)$$

The root of the tree of shapes may be the whole image domain Ω, while its connectivity may be naturally defined by the order of the geometric inclusion of the shapes.

Thus, given a shape S$^k$ and its children $\{S^m\}_m$ in the tree of shapes, the corresponding node of the level set tree, γ$^k$, is given by all the pixels that belong to S$^k$, but not to any of its children $$\gamma^k = \left\{ p \in \Omega | p \in S^k, p \notin \bigcup_m S^m \right\}. \qquad (12)$$

The connectivity E of the level set tree corresponds to the connectivity of the tree of shapes.

It may be noted that a level set tree of an image comprising N pixels may be constructed from a tree of shapes in linear O(N) time if the image is quantized, and in O(Nlog (N)) time otherwise. Distances from a given source pixel p to the rest of the image pixels may be calculated in O(N)

time by exploiting the fact that the level set tree is an undirected cyclical graph. Thus, for a quantized candidate image, the overall complexity in constructing the corresponding level set tree may be O(N).

Figure 4A:
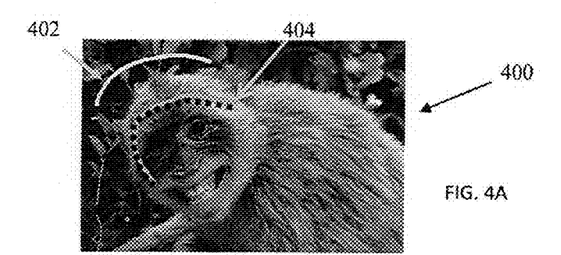
FIG. 4A illustrates an exemplary image for segmentation.
Figure 4B:
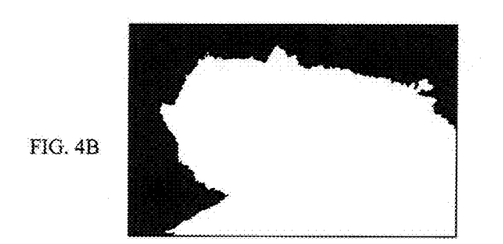
FIGS. 4B-C illustrate a segmentation of the image of FIG. 4A in accordance with an embodiment of the invention.
Figure 4C:
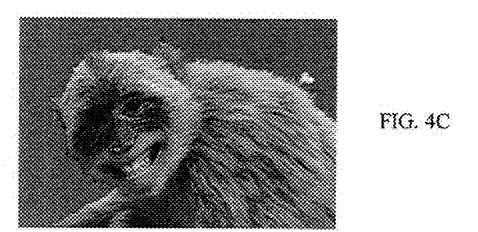
Figure 4D:
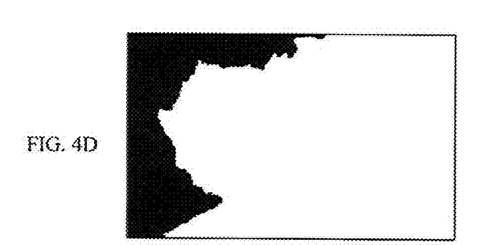
FIGS. 4D-E illustrate a segmentation of the image of FIG. 4A in accordance with one or more prior art methods.
Figure 4E:
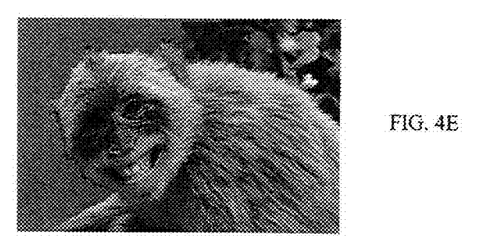

Reference is now made to FIGS. 4A-E which illustrates exemplary results of a segmentation of an image, in accordance with an embodiment of the invention. FIG. 4A shows an image 400 for segmentation, with a background pixel set defined by a scribble 402, shown as a light gray line, and a foreground pixel set defined by a scribble 404, shown as a dark dotted line. Scribbles 402 and 404 may be applied to image 400 by a user as described above. FIGS. 4B-C illustrate a segmentation into a foreground and background portion corresponding to the foreground and background pixel sets defined by scribbles 402 and 404, using the methods described in accordance with an embodiment of the invention, and FIG. 4D-E illustrates a segmentation into a foreground and background portion performed in accordance with a prior art method, where a portion of what should be included in the background portion is included with the foreground portion.

Figure 5A:
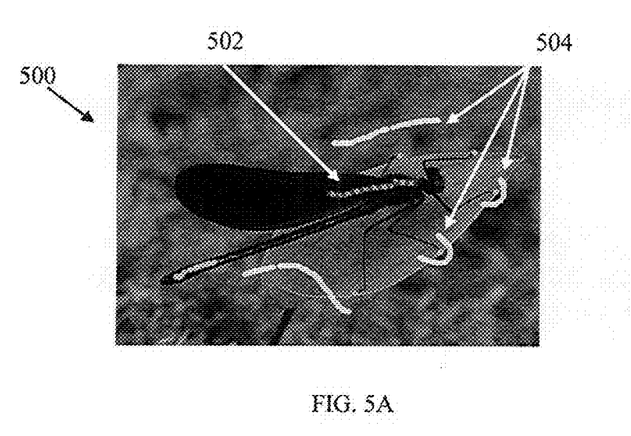
FIG. 5A illustrates another exemplary image for segmentation.
Figure 5B:
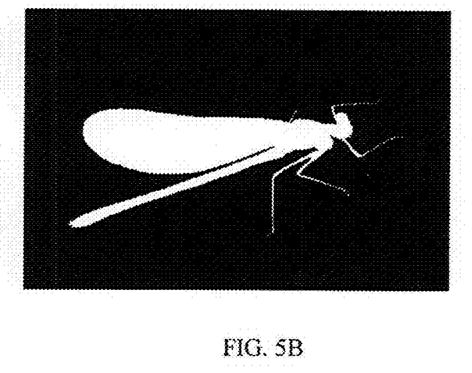
FIG. 5B illustrates a segmentation of the image of FIG. 5A in accordance with an embodiment of the invention.
Figure 5C:
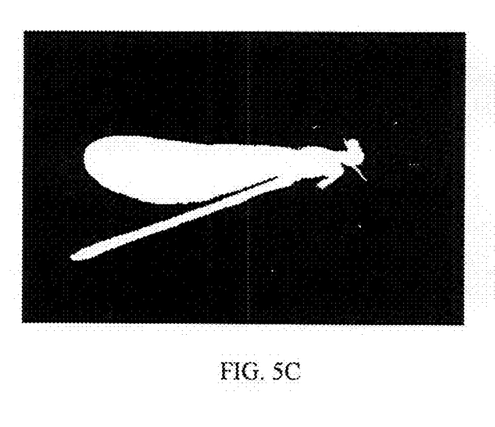
FIGS. 5C-D illustrate a segmentation of the image of FIG. 5A in accordance with one or more prior art methods.
Figure 5D:
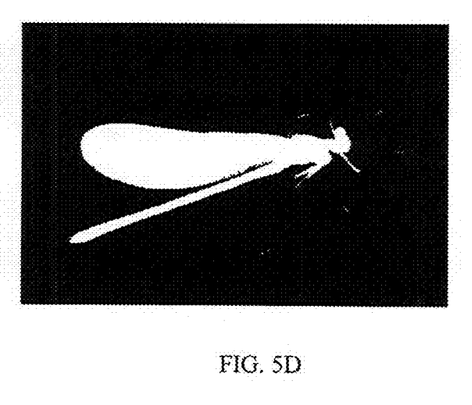

Reference is now made to FIGS. 5A-D which illustrates exemplary results of a segmentation of an image, in accordance with an embodiment of the invention. FIG. 5A shows an image 500 for segmentation, with multiple foreground pixels defined by a foreground scribble 502, shown as a grey dotted line, and multiple background pixels defined by multiple background scribbles 504, shown as white lines. FIG. 5B illustrates a segmentation of image 500 into a foreground and background portion, performed in accordance with an embodiment of the invention, and FIGS. 5C-D illustrate a segmentation of image 500 into a foreground and background portion performed in accordance with two prior art methods, where a portion of what should be included in the background portion is included with the foreground portion.

Thus, by mapping an image on a level set tree, and performing the segmentation calculations in the level-set tree domain as opposed to the image domain, segmentation of an image may be greatly improved.

The present invention may be a system, a method, and/or a computer program product. The computer program product may include a computer readable storage medium (or media) having computer readable program instructions thereon for causing a processor to carry out aspects of the present invention.

The computer readable storage medium can be a non-transitory, tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for segmenting an image, the method comprising using at least one hardware processor for:
    mapping an image onto a level set tree, wherein said level set tree comprises multiple level sets connected by multiple branches, and wherein each of said multiple level sets corresponds to a predefined range of values for an attribute of said image;
    associating multiple pixels of said image to said multiple level sets of said level set tree, in accordance with a value for each of said pixels for said attribute;
    identifying a first source level set of said multiple level sets associated with a first source pixel of said multiple pixels;
    determining that an image-domain distance between said first source pixel and one of said multiple pixels is within a predefined threshold, wherein said image-domain distance is calculated as a function of a first level-set tree distance between said first source level set and said level set associated with said one of said multiple pixels;
    associating said one of said multiple pixels with a first pixel set corresponding to said first source pixel; and
    rendering said first pixel set on a rendering medium.

2. The method of claim 1 and further comprising:
    identifying a second source level set of said multiple level sets associated with a second source pixel of said multiple pixels;
    determining that an image-domain distance between said second source pixel and a second one of said multiple pixels is within said predefined threshold, wherein said image-domain distance is calculated as a function of a second level-set tree distance between said second source level set and said level set associated with said second one of said multiple pixels;
    associating said second one of said multiple pixels with a second pixel set corresponding to said second source pixel; and
    rendering said second pixel set on said rendering medium.

3. The method of claim 2, wherein said first level-set tree distance and said second level set tree distance are calculated by applying Dijkstra's algorithm to said level set tree.

4. The method of claim 2, wherein identifying said first source level set comprises identifying a first mark applied by a user to said first source pixel and associating said first marked source pixel with said first source level set, and wherein identifying said second source level set comprises identifying a second mark applied by said user to said second source pixel and associating said second marked source pixel with said second source level set.

5. The method of claim 1, wherein said level said tree is constructed from a related tree of shapes corresponding to said image.

6. A computer program product for segmenting an image, the computer program product comprising a non-transitory computer-readable storage medium having program code embodied therewith, the program code executable by at least one hardware processor to:
    map an image onto a level set tree, wherein said level set tree comprises multiple level sets connected by multiple branches, and wherein each of said multiple level sets corresponds to a predefined range of values for an attribute of said image;
    associate multiple pixels of said image to said multiple level sets of said level set tree, in accordance with a value for each of said pixels for said attribute;
    identify a first source level set of said multiple level sets associated with a first source pixel of said multiple pixels;
    determine that an image-domain distance between said first source pixel and one of said multiple pixels is within a predefined threshold, wherein said image-domain distance is calculated as a function of a first level-set tree domain distance between said first source level set and said level set associated with said one of said multiple pixels;
    associate said one of said multiple pixels with a first pixel set corresponding to said first source pixel; and
    render said first pixel set on a rendering medium.

7. The computer program product of claim 6, wherein the program code is further executable to:
    identify a second source level set of said multiple level sets associated with a second source pixel of said multiple pixels;
    determine that an image-domain distance between said second source pixel and a second one of said multiple pixels is within said predefined threshold, wherein said image-domain distance is calculated as a function of a second level-set tree distance between said second source level set and said level set associated with said second one of said multiple pixels;

associate said second one of said multiple pixels with a second pixel set corresponding to said second source pixel; and render said second pixel set on said rendering medium.

8. The computer program product of claim 7, wherein said first level-set tree distance and said second level set tree distance are calculated by applying Dijkstra's algorithm to said level set tree.

9. The computer program product of claim 7, wherein identifying said first source level set comprises identifying a first mark applied by a user to said first source pixel and associating said first marked source pixel with said first source level set, and wherein identifying said second source level set comprises identifying a second mark applied by said user to said second source pixel and associating said second marked source pixel with said second source level set.

10. The computer program product of claim 6, wherein said level said tree is constructed from a related tree of shapes corresponding to said image.

11. A method for processing an image, the method comprising using at least one hardware processor for:

mapping a candidate image onto a level set tree, wherein said level set tree comprises multiple level sets connected by multiple branches, and wherein each of said multiple level sets corresponds to a predefined range of values for an attribute of said candidate image;

associating multiple pixels of said candidate image to said multiple level sets of said level set tree, in accordance with a value for each of said pixels for said attribute;

identifying a first source level set of said multiple level sets associated with a first source pixel of said multiple pixels;

determining that an image-domain distance between said first source pixel and one of said multiple pixels is within a predefined threshold, wherein said image-domain distance is calculated as a function of a first level-set tree distance between said first source level set and said level set associated with said one of said multiple pixels;

applying said determined image-domain distance to an image processing application, thereby producing a processed image from said candidate image; and rendering said processed image on a rendering medium.

12. The method of claim 11, and further comprising:

identifying a second source level set of said multiple level sets associated with a second source pixel of said multiple pixels;

determining that an image-domain distance between said second source pixel and a second one of said multiple pixels is within said predefined threshold, wherein said image-domain distance is calculated as a function of a second level-set tree distance between said second source level set and said level set associated with said second one of said multiple pixels;

associating said second one of said multiple pixels with a second pixel set corresponding to said second source pixel; and render said second pixel set on said rendering medium.

13. The method of claim 12, wherein said first level-set tree distance and said second level set tree distance are calculated by applying Dijkstra's algorithm to said level set tree.

14. The method of claim 12, wherein identifying said first source level set comprises identifying a first mark applied by a user to said first source pixel and associating said first marked source pixel with said first source level set, and wherein identifying said second source level set comprises identifying a second mark applied by said user to said second source pixel and associating said second marked source pixel with said second source level set.

15. The method of claim 11, wherein said level said tree is constructed from a related tree of shapes corresponding to said image.

16. A computer program product for image processing, the computer program product comprising a non-transitory computer-readable storage medium having program code embodied therewith, the program code executable by at least one hardware processor to:

map a candidate image onto a level set tree, wherein said level set tree comprises multiple level sets connected by multiple branches, and wherein each of said multiple level sets corresponds to a predefined range of values for an attribute of said candidate image;

associate multiple pixels of said candidate image to said multiple level sets of said level set tree, in accordance with a value for each of said pixels for said attribute;

identify a first source level set of said multiple level sets associated with a first source pixel of said multiple pixels;

determine that an image-domain distance between said first source pixel and one of said multiple pixels is within a predefined threshold, wherein said image-domain distance is calculated as a function of a first level-set tree distance between said first source level set and said level set associated with said one of said multiple pixels;

apply said determined image-domain distance to an image processing application, thereby producing a processed image from said candidate image; and render said processed image on a rendering medium.

17. The computer program product of claim 16, wherein the program code is further executable to:

identify a second source level set of said multiple level sets associated with a second source pixel of said multiple pixels;

determine that an image-domain distance between said second source pixel and a second one of said multiple pixels is within said predefined threshold, wherein said image-domain distance is calculated as a function of a second level-set tree distance between said second source level set and said level set associated with said second one of said multiple pixels;

associate said second one of said multiple pixels with a second pixel set corresponding to said second source pixel; and render said second pixel set on said rendering medium.

18. The computer program product of claim 17, wherein said first level-set tree distance and said second level set tree distance are calculated by applying Dijkstra's algorithm to said level set tree.

19. The computer program product of claim 17, wherein identifying said first source level set comprises identifying a first mark applied by a user to said first source pixel and associating said first marked source pixel with said first source level set, and wherein identifying said second source level set comprises identifying a second mark applied by said user to said second source pixel and associating said second marked source pixel with said second source level set.

20. The computer program product of claim 16, wherein said level said tree is constructed from a related tree of shapes corresponding to said image.

* * * * *